Sept. 11, 1962     R. B. SINGER     3,053,114
LOCKING DIFFERENTIAL
Filed April 30, 1959

INVENTOR.
ROBERT B. SINGER
BY
*Lawrence C. Withers*
ATTORNEY

United States Patent Office 3,053,114
Patented Sept. 11, 1962

3,053,114
LOCKING DIFFERENTIAL
Robert B. Singer, 4738 Mount Airy, Sylvania, Ohio
Filed Apr. 30, 1959, Ser. No. 810,147
19 Claims. (Cl. 74—711)

This invention relates to improvements in differentials in general, and is particularly directed to improvements in locking differentials wherein a substantial driving torque is provided to both driving wheels of a motor vehicle even though one of the driving wheels has little or no traction.

A primary object of this invention is to provide an improved locking differential having an inherent power of action to bias the differential mechanism and includes a driven case, intermeshing gears in the driven case, one of said gears being movable radially outwardly during relative rotation of the gears, friction clutch means positioned between the intermeshing gears and the driven case, and actuating means operatively associated with the radially movable gear for controlling the friction clutch means, whereby the differential mechanism is biased upon the application of a driving torque. A structure of this type permits controlled differential action only. That is, when the driving torque is of a relatively low value the frictional resistance to differentiation is not sufficient to completely bias the differential mechanism but will permit limited differential action between the axle shafts.

A further object of this invention is to provide a mechanism which is simple in construction, efficient in operation, inexpensive to assemble and manufacture, and which will fit into present axle housings without modification of such housings.

Further objects and advantages will become apparent upon reading the following specification together with the accompanying drawings which form a part hereof.

Figure 1:
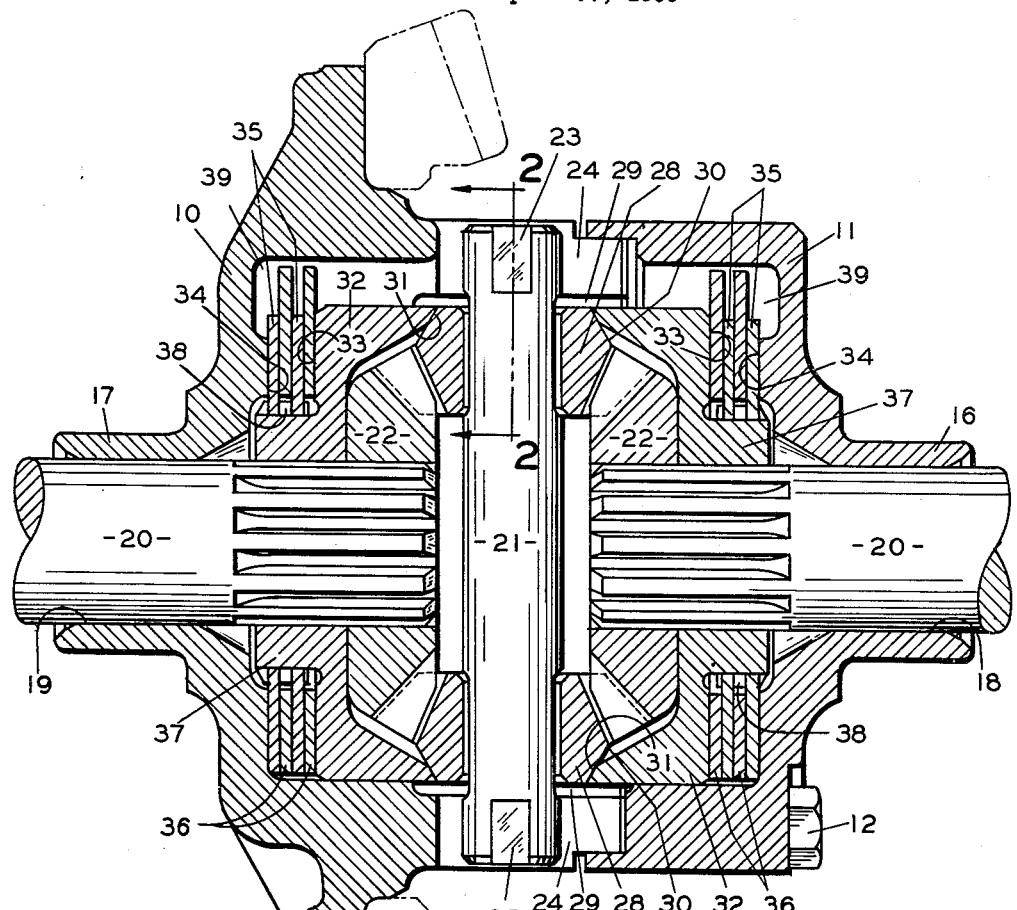
FIG. 1 is a sectional view taken in a plane containing the axis of rotation of a locking differential embodying the present invention.
Figure 2:
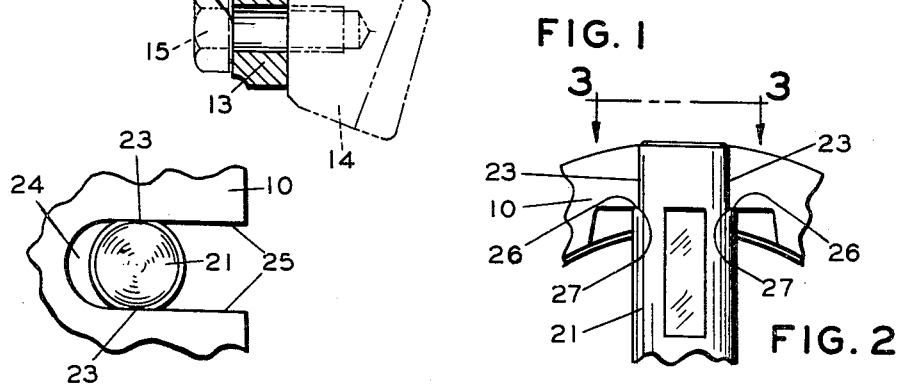
FIG. 2 is a sectional view showing the floating coupling means taken substantially along line 2—2 of FIG. 1.
Figure 3:
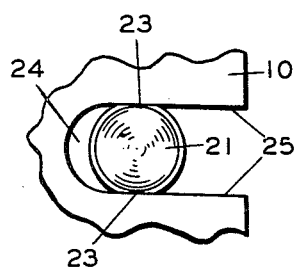
FIG. 3 is a fragmentary view taken substantially along line 3—3 of FIG. 2.

The conventional differential, as used today in most motor vehicles, divides the driving torque equally between both driving wheels. In this connection, it should be remembered that the conventional differential is uncontrolled and will always drive the wheel which is easiest to turn. This is a definite disadvantage while driving under adverse conditions, as when the traction of one of the wheels is limited.

Many designs of locking differentials have been made in an effort to provide substantial driving torque to both wheels even when one of the wheels has no traction, and still permit efficient compensating action when one wheel rotates faster than the other, as when the vehicle makes a turn. These designs have included full locking, bias or power dividing, overrunning and hydraulic types. Many methods of construction such as variable leverage, bastard teeth, eccentric pinions, cranks, cam and sliding pins, have been used. Such designs have resulted in complicated structures wherein the manufacturing tolerances are critical and the parts are subjected to excessive wear causing the differential to become inoperative. Variations of the manufacturing tolerances have tended to cause excessive "lock-up" because of the high transfer ratio involved. Further, manufacturing and assembly costs have been prohibitive making these designs impractical to produce.

The mechanism, as hereinafter described, includes means to bias the differential mechanism so that the torque transmitted to either axle shaft cannot fall below a predetermined amount. These biasing means provide internal frictional resistance to differentiation of the mechanism, thereby insuring a minimum amount of torque transfer to both axle shafts.

To accomplish the heretofore stated objects, the following factors must be considered:

(1) The means providing frictional resistance to the differential action must be variable, proportionately to the amount of driving torque transmitted to the axle shafts, providing, in effect, an automatic adjustment of the frictional resistance.

(2) It must provide for a sufficient transfer of tractive torque to the non-spinning wheel at all times and under all operating conditions.

A locking differential according to this invention utilizes the gear tooth force of the differential. This gear tooth force is amplified by the pinion cone angle and coupled with the mechanical advantage of a multiple disc clutch providing the necessary amount of frictional resistance, variable proportionately to the input driving torque.

The differential mechanism includes a driven case or housing comprising a body 10 and a cap 11. The cap 11 is secured to the body 10 in any conventional manner, as by capscrews 12. The body 10 is provided with a flange 13 for receiving a ring gear 14, shown in phantom. The ring gear 14 is secured to the flange 13 by capscrews 15, also shown in phantom, or any other suitable means. The ring gear 14 is adapted to mesh with a suitable drive pinion, not shown, for providing drive torque to the differential mechanism in the conventional manner. The cap 11 and the body 10 are provided with hubs 16 and 17 respectively, on which the differential case is journalled on bearings, not shown, for rotation in a suitable axle housing. The hubs 16 and 17 are provided with central bores 18 and 19 respectively, through which axle shafts 20 extend.

A floating coupling member 21 is provided in the form of a pin for coupling the driven case or housing to a pair of main opposing side gears 22, which have drive connections with the axle shafts 20 while being axially slidable thereon. These connections comprise inter-fitting splines formed on the shafts 20 and through central bores formed in the gears 22.

This coupling member or pin 21 extends diametrically through apertures 24 provided in the body 10. These apertures 24 are elongated to allow the pin 21 to move bodily toward either axle shaft 20. The pin 21 is provided with diametrically opposed flat surfaces 23 at each of its outer extremities. These surfaces abut the walls 25 of the apertures 24. It is to be noted that the surfaces 23 form shoulders 26 on the coupling member 21. These shoulders contact the inner wall 27 of the body 10 thereby securing the pin 21 against radial movement in relation to the body 10. It is important to note that the coupling member 21 is secured to the body 10 for unitary rotation therewith, but is free to float bodily in either direction toward an axle shaft 20. This structure allows the pin 21 to seek its own center under loaded conditions thereby equalizing or balancing the load applied to the friction clutch means.

A pair of bevel pinions or compensating gears 28 meshing with both side gears 22 are mounted on and rotatable in relation to the floating coupling member 21. The teeth of the gears 22 and the pinions 28 are arranged with their pressure angles and further have their pitch cones at such angles that during relative rotation thereof the pinions 28 are urged or pressed radially outwardly along their radial axis while the side gears 22 are urged axially outwardly along their axial axis. The body 10 is formed with a groove 29 to provide clearance between the pinions 28 and the body 10 so that no thrust loads are transmitted therebetween.

The pinion gears 28 are provided with outwardly facing conical surfaces or hubs 30. These surfaces are concentric to and in contact with inwardly facing conical surfaces 31 provided on pressure or side rings 32. The pressure rings 32 are located adjacent to and in contact with the side gears 22 and further have axially slidable drive connections with the axle shafts 20. These drive connections are a part of the aforementioned interfitting splines of the axle shafts 20.

The aforedescribed structure comprises the actuating means for loading the friction clutch means.

The friction clutch means herein described consists of interleaved discs interposed between surfaces 33 of each pressure ring 32 and the opposing side walls 34 of the casing, one set 35 being interlocked with the pressure ring 32 to rotate therewith and the other set 36 interlocked with the casing.

In the illustrated embodiment of this invention, each pressure ring 32 is provided with an external hub 37 formed with external spur teeth 38, and the casing is provided with internal annular spur gear teeth 39 opposed to and concentric with each of the spur gear teeth 38, and each disc 35 is formed with internal spur gear teeth interlocked with the spur gear teeth 38 of the pressure ring 32; and each disc 36 is formed with external gear teeth interlocked with the internal annular gear teeth 39.

The foregoing description of the friction means is employed merely for the purpose of aiding in a better understanding of the embodiment of this improved mechanism, it being understood that other types of friction devices will work equally as well.

In operation, the drive torque from the engine is transferred to the driven case in the conventional manner. As the driven member or case is rotated, the drive torque is transmitted to the opposed side gears 22 by the pinions 28. The forces set up between the intermeshing teeth of the side gears 22 and the pinions 28 urge the pinions 28 to move radially outwardly and the side gears 22 to move axially outwardly along their respective axes. The conical surfaces 30 formed on the pinions 28 bear against the conical surfaces 31 formed on the pressure rings 32 amplifying the thrust loads from the pinions 28, causing the pressure rings 32 to move axially in opposite directions to each other. It is also important to note that thrust loads are transmitted to the pressure rings 32 directly from the side gears 22 upon the outward movement thereof. Both the pinions 28 and the side gears 22 move outwardly along their respective axes in response to the aforementioned urging forces until sufficient resistance to such movement is established by the reaction of the pressure rings 32 as a result of the latter's engagement with the clutch means. Since the side gears 22 cannot move radially, they serve as the reaction for the radially moving pinions 28, and since the pinions 28 cannot move axially they serve as the reaction for the axially moving side gears 22 so that both the pinions and side gears may move simultaneously. These applied loads tend to frictionally lock the driven case directly to the axle shafts 20 through the clutch discs 35 and 36. This frictional resistance to free differential action results in the application of a driving torque to both vehicle wheels even when one of the vehicle wheels is on a slippery surface and has little or no traction. When the vehicle is making a turn, the drive torque is usually reduced and hence there is little interference with differential action when required.

The cone angles of the conical surfaces 30 and 31, respectively, of the pinions 28 and the pressure rings 32 are critical in the sense that too wide an angle will prevent sufficient frictional resistance to resist wheel runaway and render the differential mechanism ineffective for this purpose; too small an angle will effect maneuverability of the vehicle.

It will be obvious that various changes in the details which have been herein described and illustrated in order to explain the nature of this invention, may be made by those skilled in the art within the principle and scope of the invention as expressed in the appended claims.

What is claimed is:

1. A differential transmission with a frictional resistance to differentiation applied by, and in proportion to, the input torque, comprising a driven case, and intermeshing gears in the driven case, one of said gears being movable radially outwardly during relative rotation of the gears, said movable gear being provided with axially outwardly facing conical surfaces, pressure rings movable axially and rotatable in the case in coaxial relation with the other said gear, the pressure rings being provided with inwardly facing conical surfaces for cooperation with the conical surfaces of the movable gear, said pressure rings further being provided with external gear teeth, the driven case being provided with internal gear teeth opposed to said external gear teeth, and interleaved discs between the axially shiftable gear and the opposing face of the driven case, one set of discs having internal gear teeth interlocked with the gear teeth of the pressure rings and the other set of discs having external gear teeth interlocked with the internal gear teeth of said case, whereby a component of tooth pressure force of the intermeshing gears moves said movable gear radially outwardly for urging said pressure ring axially outwardly to effect frictional resistance to differential action in proportion to input torque at all speeds.

2. A differential transmission with a frictional resistance to differentiation applied by, and in proportion to, the input torque, comprising a driven case, main opposing gears mounted in the driven case, compensating gearing between the opposing gears, the compensating gearing being shiftable radially outwardly, during relative rotation of the compensating gearing and the main gears, pressure rings shiftable axially and rotatable in the case in coaxial relation with the main gears, the compensating gearing being provided with integral hubs having axially outwardly facing conical surfaces thereon, and said pressure rings being provided with inwardly facing conical surfaces concentric to and in contact with the first said conical surfaces, the pressure rings further being provided with integral hubs and external spur gear teeth on said hubs and the case being provided with internal annular spur gear teeth concentric with the former spur gear teeth, and interleaved discs between each of the pressure rings and the opposing face of the case, one set of discs having peripheral gear teeth interlocked with the internal gear teeth of the case and the other set of discs having internal gear teeth interlocked with the external spur gear teeth of the companion pressure ring, whereby outwardly radial movement of the compensating gearing urges said pressure rings axially outwardly effecting frictional resistance to differential action in proportion to the input drive torque.

3. A differential transmission with a frictional resistance to differentiation applied by, and in proportion to, the input torque, comprising a driven case, main opposing gears mounted in the driven case, compensating gearing rotatable with said driven case located between the opposing gears in mesh therewith, means to locate said compensating gearing relative to said driven case to permit the compensating gearing to rotate and move radially outwardly, axially shiftable pressure rings rotatable in the case in coaxial relation with the main gears, the compensating gearing being provided with integral hubs and outwardly facing conical surfaces on said hubs, and the pressure rings being provided with inwardly facing conical surfaces concentric to and in contact with the former conical surfaces, friction discs carried by and in fixed relation to said pressure rings interleaved for frictional engagement with friction discs carried by and in fixed relation to the driven case, whereby outwardly radial movement of the compensating gearing urges said pressure rings axially apart effecting frictional resistance to differential action in proportion to the input drive torque.

4. A differential transmission according to claim 3 in which the means to locate said compensating gearing comprises, a member extending through said compensating gearing into said casing, whereby said compensating gearing has rotatable movement and radially outwardly shiftable movement in relation to said member.

5. A differential transmission according to claim 4 in which the member extending through compensating gearing comprises, a pin provided with opposed flat surfaces at its outer extremities, and means centrally of said case lying on either side of said pin for restraining said pin against rotation relative to said case, said means including matching and facing recesses cooperating with the opposed flat surfaces of said pin thereby restraining said pin against rotation in relation to said case.

6. A differential transmission having a frictional resistive force to differentiation applied by, and in proportion to, the input torque, comprising, a driven casing having axle openings in opposed sides thereof, means forming a recess to receive side rings adjacent said axle openings, inwardly facing friction surfaces spaced normal to the axis of the casing to lie adjacent the ends of the recess, friction means positioned adjacent said friction surfaces, side rings having friction surfaces on the rear faces thereof to engage and cooperate with said friction means thereby to form a friction developing means having a mechanical advantage, the side rings having inwardly facing conical surfaces spaced normal from the axis of the casing to lie adjacent the outermost diameter of the recess relative to said axis and diverging towards the center of the casing and further forming pockets therein, axle ends extending into said axle openings, means on said side rings and means on said ends wherein said rings are slidably mounted on and rotatable with said ends within the casing, bevel side gears in said pockets having inwardly facing teeth, pinion gears mounted between said side gears in mesh therewith, means to couple said pinion gears relative to said casing to permit radial movement of said pinion gears, the pinion gears further being provided with rear hubs having conical extensions formed thereon to coincide and engage the conical surfaces of the side rings, the pitch line of the said side and pinion gears being disposed at an angle to utilize the axial thrust of the meshing teeth of the said gears to force the pinion gears outward radially thereby moving the side rings axially outwardly to utilize the mechanical advantage of the friction means in proportion to the input torque applied to the said transmission.

7. A differential transmission according to claim 6 wherein the driven casing is provided with an annular groove for permitting said pinion gearing to move radially outwardly, means in said casing to permit said pinion gearing to move axially on said coupling means.

8. A differential transmission with frictional resistance to differentiation applied by, and in proportion to, the input torque, comprising a rotatable driven case, two axially aligned pressure rings rotatably mounted in said case with at least one of said pressure rings being axially movable relative to said case, clutch means on each axially movable pressure ring, clutch means carried by and in fixed relation to said case for frictional engagement with said clutch means on the axially movable pressure ring, two axially aligned bevel side gears located between the said pressure rings, a coupling member having an outer end operably engaging said case, means permitting said coupling member to move axially relative to said case in direction of said side gears for equalizing applied loads to said pressure rings, a bevel pinion gear journaled on said coupling member movable in relation thereto and being disposed in meshing engagement with said side gears, said pressure rings and said pinion gear each having an annular conical surface in contact with each other for transmitting and amplifying the forces from said pinion gear to said pressure rings for moving said pressure rings axially thereof into clutching engagement with said case, whereby outwardly radial movement of the pinion gear urges said pressure rings axially apart effecting frictional resistance to differential action in proportion to the input drive torque.

9. A differential transmission with a resistive force to differentiation applied by and in proportion to the input torque, comprising a rotatable housing provided with axle openings at opposed ends thereof, a recess formed within said housing extending radially outward from the axis thereof, said axle openings being adapted to receive axle ends projecting into said recess, pressure rings slidable on and rotatable with said ends within said housing adjacent the ends of said recess, friction means between said pressure rings and said housing associating said pressure rings to said housing and affording a mechanical advantage to outward axial forces on said pressure rings, bevel side gears rotatable with said axle ends within said housing between the said pressure rings, pinion gears mounted between said side gears in mesh therewith located to rotate relative to and revolve with said housing, the pinion gears and side gears being meshed in relationship to provide a component of tooth pressure for urging said pinion gears radially outwardly to apply pressure to said friction means to utilize the mechanical advantage thereof in resisting motion of said respective pressure rings, the pinion gears further being formed with outwardly facing conical surfaces to amplify the force applied to said friction means in proportion to the input torque to said transmission at all speeds.

10. A differential mechanism with frictional resistance to differentiation applied by and in proportion to the input torque, comprising a rotatable driven case having an elongated aperture, two axially aligned pressure rings rotatably mounted in said case with at least one of said pressure rings being axially movable relative to said case, clutch means on the axially movable pressure ring, other clutch means carried by and in fixed relation to said case for frictional engagement with said clutch means on the axially movable pressure ring, a coupling member having an outer end slidably engaging said elongated aperture to effect movement of said coupling member relative to said case for equalizing applied loads between said pressure rings in an axial direction, two axially aligned bevel side gears located between the said pressure rings, a bevel pinion gear journaled on said coupling member and disposed in meshing engagement with said side gears, said pressure rings and said pinion gears each having an annular conical surface in contact with each other for transmitting and amplifying the forces from the said pinion gear to the said movable pressure ring for moving said pressure ring into clutching engagement with said case, whereby radially outwardly movement of the pinion gear urges said pressure ring axially outwardly effecting frictional resistance to differential action in proportion to the input drive torque.

11. A differential transmission with frictional resistance to differentiation applied by and in proportion to the input torque, comprising a rotatable driven case having elongated slots on diametrically opposite sides of the axis of rotation thereof, two axially movable pressure rings rotatably mounted in said case, clutch means on each of said pressure rings, clutch means carried and in fixed relation to said case for frictional engagement with said clutch means on said pressure rings, a coupling pin slidably engaging said elongated slots to effect axial movement of said coupling pin relative to said case for equalizing applied load to said pressure rings, two axially aligned bevel side gears located between the said pressure rings, a bevel pinion gear journaled on said coupling pin for radial movement in relation thereto and being disposed in meshing engagement with said side gears, said pressure rings and said pinion gear each having an annular conical surface in contact with each other for transmitting and amplifying the forces from the said pinion gear to the said pressure rings for moving said pressure rings axially thereof into clutching engagement with said case, whereby outwardly radial movement of the pinion gear urges said pressure rings axially apart effecting frictional resistance to differential action in proportion to the input torque at all speeds.

12. In a differential transmission the combination comprising a case, a power transmission gear train disposed in said case and including a side gear and a compensating gear, clutch means disposed between said side gear and said case for opposing relative rotative movement of gears of said gear train, said compensating gear being movable along its axis upon application of input torque to the differential causing actuation of said clutch means.

13. In a differential transmission the combination comprising a case, a power transmission gear train operatively disposed within said case and including a side gear and a compensating gear, clutch means disposed between said side gear and said case and including a pressure member, said compensating gear being movable along its axis upon application of input torque to the differential and camming said pressure member to retard the compensating action of the differential.

14. In a differential transmission the combination comprising a case, a power transmission gear train disposed in said case and including intermeshing side and compensating gears, clutch means disposed between said side gear and said case for opposing relative rotative movement of gears of said gear train, said side gear and said compensating gear having gear teeth with a positive pressure angle whereby said compensating gear is moved along its axis upon rotation of the gears, and means on said compensating gear engageable with said clutch means for loading the same upon axial movement of the compensating gear.

15. The combination of the claim 14 wherein said clutch means includes a pressure member adapted to be engaged by said compensating gear.

16. In a differential transmission unit the combination of a case, differential gearing comprising a pair of opposed side gears in said case each adapted for connection to an axle shaft, a coupling member floatingly mounted in said case for movement between the side gears, compensating gearing carried by said coupling member and intermeshing with said side gears, said compensating gearing and said side gears having teeth with a positive pressure angle whereby said compensating gearing is movable axially relative to said coupling member upon rotation of the gears, and a pair of clutch means disposed between said differential gearing and said case, said compensating gearing actuating both clutch means upon movement of the compensating gearing along its axis, and said coupling member being movable to equalize the load between said pair of clutch means.

17. In a differential transmission assembly the combination of a case, differential gearing disposed in said case and comprising a pair of opposed side gears each adapted for connection to an axle shaft, compensating gearing intermeshing with said side gears, coupling means carrying said compensating gearing and being floatingly mounted in said case for movement between said side gears, clutch means disposed between each side gear and the case for opposing relative rotative movement of gears of said differential gearing, said side gears and said compensating gearing having positive pressure angle teeth whereby said compensating gearing moves along the axis thereof upon rotation of the gears, and means on said compensating gearing causing actuation of said clutch means upon movement of the compensating gearing along its axis, said coupling means moving to equalize the load between said clutch means.

18. In a differential transmission the combination comprising a case, a power transmission gear train disposed in said case and including at least a side gear and a compensating gear, and at least a single clutch means disposed between said gear train and said case, said side gear and said compensating gear being movable along their respective axis upon the application of input torque to the differential for actuating said single clutch means.

19. In a differential transmission the combination comprising a case, a power transmission gear train disposed in said case including a pair of side gears and a pair of compensating gears each meshing with said side gears, a pair of clutch means disposed between said gear train and said case, one of said side gears and one of said compensating gears each being movable along its respective axis upon the application of input torque to the differential for engaging one of said clutch means, the other of said side gears and the other of said compensating gears each being movable along its respective axis for causing engagement of the other of said clutch means upon the application of input torque to the differential whereby differential action is retarded.

References Cited in the file of this patent

UNITED STATES PATENTS

| | | |
|---|---|---|
| 1,529,804 | Nogrady | Mar. 17, 1925 |
| 1,620,246 | Walter | Mar. 8, 1927 |
| 2,762,240 | Eckert | Sept. 11, 1956 |
| 2,817,251 | Stamm | Dec. 24, 1957 |
| 2,855,805 | Fallon | Oct. 14, 1958 |
| 2,873,622 | Nash | Feb. 17, 1959 |
| 2,971,404 | Thornton | Feb. 14, 1961 |